(No Model.)

J. S. MILES.
FILTER.

No. 559,590.             Patented May 5, 1896.

WITNESSES:
Frank M. Burnham
Chas. I. Welch

INVENTOR
John S. Miles
BY
ATTORNEY.

UNITED STATES PATENT OFFICE.

JOHN S. MILES, OF DAYTON, OHIO.

FILTER.

SPECIFICATION forming part of Letters Patent No. 559,590, dated May 5, 1896.

Application filed January 2, 1895. Serial No. 533,669. (No model.)

*To all whom it may concern:*

Be it known that I, JOHN S. MILES, a citizen of the United States, residing at Dayton, in the county of Montgomery and State of Ohio, have invented certain new and useful Improvements in Filters, of which the following is a specification.

My invention relates to improvements in filters, and especially to that class of filters employing a filtering medium formed from natural stone, such as tripoli and similar substances.

The object of my invention is to employ a filter of extremely simple construction which may be readily taken apart for cleaning and as readily assembled, and when assembled be capable of efficient operation. I attain these objects by the constructions shown in the accompanying drawings, in which—

Figure 1:
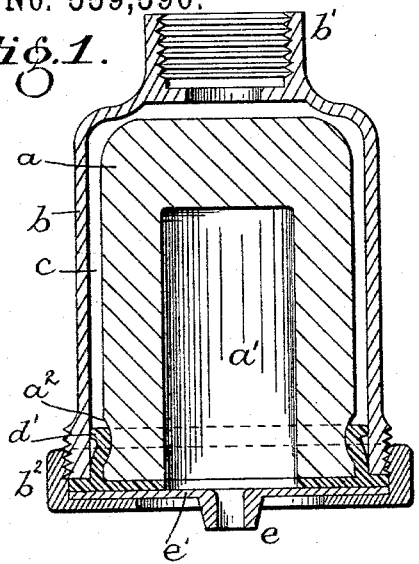
Figure 2:
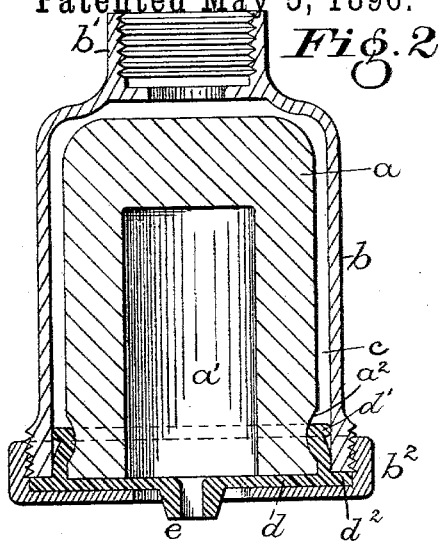
Figure 3:
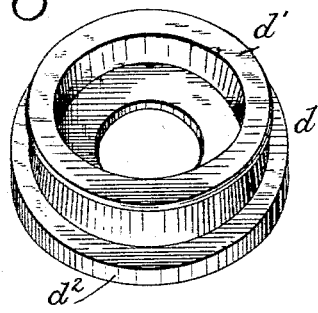
Figure 4:
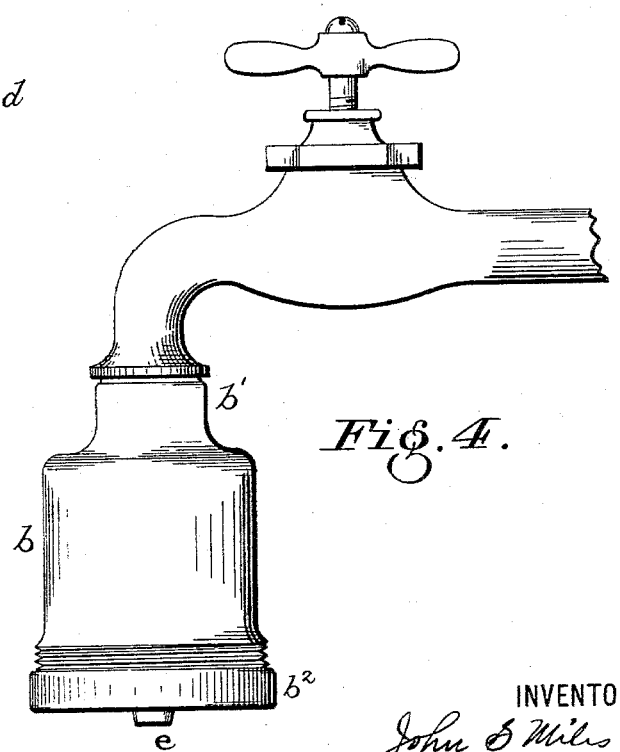

Figure 1 is a sectional elevation of a device embodying my invention. Fig. 2 is a similar view showing a slight modification. Fig. 3 is a detail view in perspective of the cap or connecting-ring as used in Fig. 1. Fig. 4 is a side elevation showing the filter as applied to an ordinary faucet or bib-cock ready for operation.

Like parts are represented by similar letters of reference in the several views.

In my improved filter I preferably employ a cylindrical filtering medium $a$, formed from tripoli rock or similar material. This filtering medium is bored out or otherwise formed with a central opening or pocket $a'$, which is open at one end and closed at the other by the walls of the filtering material. This filtering medium or block $a$ is inclosed in an outer casing $b$, similarly shaped, but sufficiently large to leave a suitable space $c$ between the outer casing and the filtering medium for the liquid to be filtered. This casing is provided at one end with a neck $b'$ internally screw-threaded, so as to screw securely onto an ordinary faucet or bib-cock. The opposite end of the casing is provided with a screw-collar $b^2$, which screws onto said casing in the nature of a cap. The filtering medium $a$ is secured in said casing and is firmly connected thereto by means of a packing-ring or cap $d$ of peculiar construction. This ring or cap $d$ is constructed with an annular ring $d'$, adapted to slip over and engage the outer periphery of the filtering-block at its open end, said filtering-block being provided with a grooved recess $a^2$ at this point for this purpose. This ring $d'$ is made slightly smaller than the filter-block, so as to fit firmly thereon by the elasticity of the cap, which is preferably formed from rubber. Extending outwardly from this annular ring $d'$ is a lateral flange $d^2$, which engages the end of the casing, and when the screw-collar $b^2$ is in place is firmly engaged between said collar and the end of the casing, thus making a tight joint and firmly connecting the parts together.

To provide for collecting the filtrate into a smaller compass than the central opening $a'$, I employ a projecting nozzle $e$. This nozzle may be formed directly in the cap $d$, as shown in Fig. 2, or it may be formed in a separate plate $e'$, which rests in the collar $b^2$, so as to engage the bottom portion of the cap or packing-ring $d$, as shown in Fig. 1. If the discharge-nozzle $e$ is formed in the cap or packing-ring itself, then the material of the cap, if rubber, is vulcanized at this point, so as to secure the proper degree of hardness or rigidity. When the nozzle is so constructed, the plate $e'$ may be entirely dispensed with, the cap or packing-ring being adapted at once to close the end of the filtering medium, connect the same to the outer casing, and to form a packing between said casing and its removable cap or collar.

In assembling the parts the cap is slipped over the filtering medium and the filtering medium placed in the casing. The screw-collar is then screwed thereon and the device is ready for operation.

To clean the filter, it is only necessary to remove the screw-collar, after which the filtering medium may be removed from the casing with the flexible or elastic cap thereon. After cleaning it may be replaced in the manner before described and be again ready for operation.

Having thus described my invention, I claim—

The combination with an outer casing and a filtering medium consisting of an open-ended filtering-block, as described, an elastic cap for said filtering medium having a projecting flange to engage the sides of said block and a base which is projected laterally so as to engage an outer casing, a reduced opening through said cap, and a central projection or nozzle surrounding said opening, said nozzle being formed harder than the other portion of said cap, and a screw-collar on said casing to engage said cap and hold the parts together, substantially as specified.

In testimony whereof I have hereunto set my hand this 6th day of December, A. D. 1894.

JOHN S. MILES.

Witnesses:
H. J. CHANCELLOR,
J. A. MILLER.